United States Patent [19]

Vinther

[11] Patent Number: 4,748,780
[45] Date of Patent: Jun. 7, 1988

[54] COMPOSITE PANELS AND METHODS OF MAKING COMPOSITE PANELS

[75] Inventor: Knud Vinther, Solbjerg, Denmark

[73] Assignee: DUROpal-Werk Eberh. Wrede GmbH & Co. KG, Arnsberg, Fed. Rep. of Germany

[21] Appl. No.: 47,001

[22] Filed: May 7, 1987

Related U.S. Application Data

[62] Division of Ser. No. 695,081, Jan. 25, 1985, Pat. No. 4,663,912.

[51] Int. Cl.$^4$ ............................................. E04C 2/38
[52] U.S. Cl. ........................... 52/309.3; 52/309.13; 52/783; 52/813; 52/802; 52/822
[58] Field of Search ............... 52/802, 783, 821, 822, 52/823, 824, 825, 811, 309.1, 309.13, 309.14, 309.15, 309.3

[56] References Cited

U.S. PATENT DOCUMENTS

| | | | |
|---|---|---|---|
| 2,278,331 | 3/1942 | Meyercord | 52/802 |
| 2,605,157 | 7/1952 | Reitzel | 52/783 |
| 2,787,345 | 4/1957 | Soubier | 52/802 |
| 3,223,056 | 12/1965 | Wilburn | 52/783 |
| 3,786,609 | 1/1974 | Difazio | 52/802 |

Primary Examiner—John E. Murtagh
Attorney, Agent, or Firm—Sixbey, Friedman & Leedom

[57] ABSTRACT

A composite panel, with a core member; a cover plate glued to the upper side of the core member, and also a cover plate glued to the lower side; and with an edge strip secured to the rim of the core member. The composite panel substantially avoids dimensional tolerance problems which can arise at the edge strip, and high demands made during technical use, and by designers, can be met by the panel. The edge strip includes two corner strips which extend centrally from the edge strip and which have a width which is precisely, i.e. with negligible tolerance, predetermined. The edge strip also has a central strip. The core member comprises peripheral ledges which extend centrally from the upper and lower sides with precisely predetermined thickness, and an intermediate component arranged between the ledges. The thickness of the peripheral ledges is adapted to the width of the corner strips of the edge strip.

8 Claims, 6 Drawing Sheets

COMPOSITE PANELS AND METHODS OF MAKING COMPOSITE PANELS

This application is a division of application Ser. No. 695,081 filed Jan 25, 1985 and which issues as U.S. Pat. No. 4,663,912.

CROSS-REFERENCE TO RELATED APPLICATION

This application is related to commonly assigned copending application Ser. No. 638,956 filed 8 Aug. 1984 now U.S. Pat. No. 4,570,410.

FIELD OF THE INVENTION

My present invention relates to composite panels and, more particularly, to composite panels of the type having a core member, a cover plate glued to the upper side of the core member, and an edge strip secured, for example by glueing, to the periphery or rim of the core member. Preferably, the panel also includes a cover plate glued to the lower side.

My invention also relates to methods of making composite panels.

BACKGROUND OF THE INVENTION

Composite panels and methods of making them are well known. A composite panel generally includes a core member or plate, usually made of wood chips and similar particles that are consolidated into boards and the like. Other materials are basically applicable as well, including natural wood boards, synthetic resin slabs and the like.

A cover, protective laminate, or cover plate is glued onto the upper side of the core member. This is usually a high-pressure laminate (e.g. a phenolic laminate) as described in German Industrial Standard DIN 16 926 for HPL plate. Plates or sheets made of other materials, for example thermosetting and thermoplastic materials, veneers and metal are known, and the material selection may be dictated by the application at hand.

The cover glued onto the core member or sheet should be resistant to water and heat, which makes high-pressure multi-layer plates particularly desirable. Frequently, the lower side, bottom or underside of the core member is also covered with a high-pressure laminate plate.

One of the difficulties associated with such composite panels is the proper protection, edging, and covering of the peripheral edges or rims. At one edge, i.e. that shorter side which corresponds generally to the panel width, or at opposing edges, protection and cover may be provided by extending the cover plate, which is glued onto the core member, in such a way that it may be brought over the respective edge for covering the edge, and then glueing it down. This is suggested in U.S. Pat. No. 3,849,235.

In this manner, the upper cover plate can form a continuum with the lower cover plate of such a composite plate or panel. When using special machines it is also possible to cover all four edges, or narrow sides, of a core member, by correspondingly surrounding these with the cover plate material. Such measures, however, are difficult to achieve in mass or serial production. Furthermore, even such four-way enclosing techniques leave gaps which will cause problems.

Accordingly, for reasons of production, economics and esthetics, the art generally suggests that only two narrow sides or edges of the core member are to be covered as briefly indicated in the foregoing. The remaining open edges are covered by separate protective covers. These additional covers or edge strips are variously known as glue-around-strips, endless-edges, and the like. They are made of the same material as the respective cover plate after cutting thereof. (See the brochure P 69 15982 of the firm Duropal-Werk Eberh. Wrede GmbH & Co. KG, Arnsberg, Germany with the title "Hochdruck-Qualitäten" or "High Pressure Quality in The Production Program of Das Leistungsprogramm von DUROpal".)

The known composite panel described above is associated with the long-standing problem of certain production tolerances or clearances of the core member. For example, when using as a core member a piece of lumber with a thickness of 18 mm, one would attempt to achieve an accuracy of at least ±0.5 mm, and at best ±0.3 mm. In comparison with this, the respective production tolerances of the covers and the edge strips are negligible. At a thickness of 0.8 mm with negligible tolerance for the cover plate, the overall height or thickness is 19.6 mm ±0.5 mm (preferably ±0.3 mm).

The edge strip with its negligible tolerance is generally cut somewhat wider, or narrower, from the respective material, which is either the same as the cover plate, or made of another material, for example aluminum. This gives rise to gaps which present problems and difficulties, particularly moisture-related difficulties. In addition, it is quite common that the edge strip can laterally shift during or after the glueing thereof to the rim or narrow side of a core member. The gaps would then undesirably increase in size, or sudden steps are created at the edge or narrow side of the core member.

It has been previously attempted to avoid this problem by cutting the edge strip to a width which is adapted to the upper tolerance limit of the core member. After glueing the edge strip, the edges of the strip would be further adjusted to attain the correct size. As well, the respective edges were usually also rounded.

When considering overall production requirements, such a method is cumbersome and expensive. Also, it is generally not feasible to avoid damage to, or other effects of, the cover plate which may be caused by the tools that rework the edges of the edge strip. When using special decorative cover plates, this is particularly detrimental. For example, a special surface texture or grain texture is damaged at the edges, or is similarly affected. This applies even then when using an edge strip that is fully dyed or colored and in which, accordingly, no dark intermediate layers are discernable. In summary, the affected peripheral regions of such composite panels do not meet the high demands made by designers or builders.

The gaps for or due to glueing at the edge strips also present problems because they may allow entry of moisture, either by diffusion or by capillary action. Entry of moisture is a considerable problem when the core member is made of solid lumber, or is made of wood chips. At such gaps, the core member is protected against entry of moisture only by the glue itself, and even minute irregularities during glueing can lead to difficulties. This applies in the case of glueing any material. The customary materials have been, of course, well known for many years.

OBJECTS OF THE INVENTION

Based on the prior art described above, it is the principal object of my invention to provide a composite panel which substantially precludes the disadvantages of the prior art.

It is also an object of the invention to provide an improved composite panel with an edge strip in which the tolerance problems associated with the edge strip are substantially eliminated.

It is furthermore an object of the invention to provide a composite panel which meets highest demands made by users thereof.

It is further an object of my invention to provide a composite panel without undesirable gaps or r ges at the narrow side of the core member.

It is also an object of the present invention to provide a method for the production of composite panels which is simple and economical.

Another object is also to provide an improved method of producing composite panels with high accuracies and low dimensional deficiencies.

It is further an object of the invention to produce an improved composite panel which is substantially moisture resistant.

SUMMARY OF THE INVENTION

These objects are attained in accordance with the invention in that the thickness of a pair of peripheral legs or ledges of the core member, and the width of the corner (boundary) strips of the peripheral or edge strip, are precisely, i.e. with negligible tolerance, predetermined and adapted to one another.

Of course, during adaptation of the thickness of the peripheral ledges of the core member to the width of the corner or boundary strips of the edge strip, the thickness of the cover plates needs to be considered. This thickness is predetermined with negligible tolerances.

It is important in carrying out my invention that the dimensioning of the peripheral ledges of the core member is precise from the exterior to the interior, i.e. with negligible tolerances or deviations. This means that only the unavoidable production tolerance described above, i.e. the tolerance or tolerances experienced during production of the core member per se is fully and exclusively brought to bear at the intermediate component of the core member. However, at such location respective tolerances or inaccuracies can be considered and eliminated, respectively. This will be described below in greater detail.

According to the method of my invention, at the rim or narrower side of the core member, on the one hand from the upper side, and on the other hand from the lower side, respectively, a peripheral core ledge is formed. Each ledge has a thickness which is predetermined with relation to the corner strips of the edge strips. Also, the thickness of the intermediate component remaining between the peripheral ledges of the core member is in agreement with or is related to the actual thickness of the core member, within the tolerance limits present. Alternately, the intermediate component is furnished by a compensating groove and this can be widened by means of an expansion piece cooperating with the edge strip, to a distance which is related to the upper tolerance limit of the core member. It is also contemplated that the intermediate component can be compressed by means of the edge strip to a thickness which is related to the lower tolerance limit of the core member.

The methods include a number of ways suitable for the elimination or prevention of unduly large production tolerances or inaccuracies.

In accordance with one preferred embodiment of the composite panel, the two corner strips and the central strip of the edge strip are separate parts. It is also preferred that the two boundary or corner strips or portions of the edge strip are fashioned as edge protectors (keders). These edge protectors can have rounded edges. The edge protectors may also be provided by L-shaped and/or U-shaped edge rail-elements, and the like. Alternately, the edge protectors can be formed by the two cover plates which are brought around, for example by bending, respective ends of the ledges or edges of the core member. Then they are glued to the peripheral ledges of the core member.

It is important that the width of the corner strips be accurately predetermined, but the width of the central strip of the edge strip need not be precisely predetermined. Accordingly, the central strip of the edge strip can be adapted in its width to the thickness of the intermediate component of the core member.

Using the ends of the covers, sheets or plates to form the edge strip represents a rather preferred embodiment, and this concerns the special case of a composite panel, i.e. respective edges or ends of the two cover plates provide the corner strips. As mentioned before, such a construction will usually only be used at two opposite edges, or narrow sides; and only when an identical edge construction at all sides or edges is not preferred. Moreover, this embodiment will be applicable when subsequently a central strip is introduced with precisely predetermined width. As well, alignments and simlar corrections may have to be made.

In accordance with another preferred embodiments, the peripheral ledges of the core member are furnished with grooves, and the like openings, for inserting thereinto the two corner strips or lateral or boundary sections, or components thereof. This is accomplished in such a way that a precisely predetermined position is available for the corner strips at the core member. Of course, the corner strips may be glued to the core member at this location.

In accordance with yet another embodiment of the invention it is also contemplated that the corner strips and/or the central strip of the edge strip be made of the material of which the cover plates are made. Whether they are made of the same or of a different material, as desired, special technical, artistic, and design effects can be achieved.

Reference has been made to the fact that the central strip is separate from the corner strips. This central strip can be readily glued and otherwise secured to the intermediate component of the core member. It is then highly advantageous that the central strip and the cover plates be made of the same material.

In accordance with another embodiment of the invention, the central strip of the edge strip is formed by a filler or filling which is introduced between the two corner strips of the edge strip. Preferably, this is a filling of a settable (hardening) epoxy resin, and the like material.

Filling or filler materials are known in the art. It is important, however, that the filling which forms the central strip does not unduly shrink or is not unduly compressed.

In accordance with still another embodiment, the corner or rim strip is a unitary element made of the two corner strips, and with the central strip or component or components.

Preferably, the central component—when the edge strip has not been secured at the rim of the core member—has a width which corresponds to the lower tolerance limit of the core member, but which is expandable to a width which is related to or corresponds to the respective upper tolerance limit of the core member. This embodiment achieves adaptation of the width of the edge strip to the actual thickness of the core member. Such a central strip in the edge strip can be fully attained using modern manufacturing methods, and the corner strips need also not be correspondingly elastic.

In yet another preferred embodiment the intermediate component of the core member is a compensating groove which is centrally arranged in the core member. It is also preferred that the central component of the edge strip have an expansion piece which can be introduced into and secured in the compensating groove. The compensating groove can be readily widened in such a way that, in any case, the thickness of the composite panel is peripherally brought to a thickness which corresponds to the upper tolerance limit of the composite panel. Conversely, the groove can be narrowed, for example by compression so that, in any case, the thickness of the composite panel can peripherally be brought to a thickness which corresponds or is related to the lower tolerance limit of the composite panel. Most common and particularly preferred is a widening of the compensating groove.

The depth of the compensating groove is otherwise predetermined by the tolerance-width of the core member, i.e. the maximally necessary widening of the compensating groove. In the example with the numerical values discussed above, the recommended depth is approximately 18 mm for a widening of maximally 0.6 mm.

The teaching of the invention described thus far can usefully also be realized in an embodiment which includes an expansion piece, as has been described. The expansion piece is preferably in the form of a strip, and at the free end is provided with inclined formations or surfaces (bevels) so that it can be introduced with ease into the compensating groove in the core member.

The teaching of this invention also resides in the preferred embodiment wherein the corner strips of the edge strip are formed by respective edges or portions of the cover sheets or plates. Such portions can be bent around the rims or edges of the core member and glued to the peripheral portions of the core member. By way of example, a separate expansion piece can then be glued to the central strip of the edge strip in a prearranged manner.

The location of the compensating groove can, of course, fluctuate at the edge of the core member. Reference to a "centrally" arranged groove in the core member is to be understood as for orientation purposes only. When in fact the compensating groove is precisely and centrally produced in the core member, for calculating the thickness of the peripheral ledges of the core member, the following equation applies:

$$d = \frac{D + \Delta D - B}{2}$$

wherein:

d = width or breadth of a peripheral ledge without consideration of the cover plate;

D = average thickness of the core member—nominal (blueprint value) thickness;

$\Delta D$ = upper tolerance limit of the core member—plus (+)—tolerance; and

B = width of the expansion piece.

The expansion piece described above can be unitary with or at the edge strip. Alternately, it may be a part which is separate from the edge strip. When the expansion piece is a separate component, it is then preferred that the edge strip be secured to the expansion piece, for example by way of clamping action, in the manner of a detent connection, by position-true glueing, or in other equivalent ways.

The number of possible variations of the composite panel in accordance with the invention is increased because the constructive requirements of the material of the edge strip can be relatively neglected although they need to be considered for the material for the expansion piece.

In accordance with yet another preferred embodiment of the invention, the expansion piece is furnished on both sides with a support flange at its end or side directed toward the edge strip. It is also preferred that the core member, as required, on both sides of the compensating groove, have a recess which is adapted to receive the respective support flange in an undercut or countersunk manner.

In accordance with another preferred embodiment of the invention, the corner strips and the peripheral ledges of the core member are equipped on one side or on both sides with complementary formed connections, preferably with wedge-shaped tongue and groove and similar connections. As required, these cooperate with the cover plates. It is further preferred that the grooves of such tongue and groove connection are provided in the core member.

Such tongue and groove connections prevent disruptive gaps because a wedging action occurs between the edge strip and the core member and, as applicable, the cover plates.

In accordance with still another preferred embodiment of the present invention, the edge strip or, respectively, the corner strips of the edge strip are provided with fastening projections or, respectively, with fastening bars which are inserted into corresponding grooves in the core member. In this context it is further preferred that the fastening projections or, respectively, the fastening bars exhibit barbed hooks, and the like, which can engage with the core member in a wedged manner.

This embodiment affords an exclusive, or a complementary, securing of the edge strip and/or the lateral corner strips at the core member. When the fastening bars engage in grooves or recesses near the upper and lower sides of the core member, the respective sealing distances are appreciably lengthened, and entry of moisture is more effectively prevented than can be achieved with a simple groove or gap for the glue. The grooves or recesses can also be in the form of openings which can be spread or widened, when this appears sensible. The configuration of the fastening or expansion bars as expansion pieces is correspondingly possible.

In accordance with a further embodiment which is particularly preferred because of its usefulness for production considerations, the composite panel has a compensating groove which is extended by fastening grooves, or fastening bores. In this context, it is further preferred that the expansion piece be provided with a fastening member or assembly which can be slid into the fastening groove or grooves, and which is formed with barbed hooks. Alternatively, it is provided with fastening pins with barbed hooks and which can be inserted into the fastening bores.

The compensating groove, which is present for compensating, i.e. to adapt or level, respective tolerances or unduly large deviations, is extended in depth by the fastening groove or a similar opening or openings. This does not require much additional effort during the manufacture and affords elegant means for securing the edge strip.

Another preferred feature of the invention which contains special and independent inventive importance concerns the prevention of entry of moisture in the vicinity of the edge strip. In this case, a sealant, or a sealant with adhesive properties is provided along the correspondingly lengthened distance for sealing. For this, the grooves at the upper side and/or the lower side of the core member are provided directly under the cover plates, and are filled with a watertight or waterproof sealant or with a sealant having adhesive properties, preferably an epoxy resin, and the like compounds.

Aside from its primary and considerable sealing function, use of a sealant and glueing medium affords a complementary attachment of the edge strip.

Also the corner strips of the edge strip and the cover plates are furnished with holding members which respectively extend over the upper side and the lower side of the core member. These holding members are preferably rounded. In this context, it is also preferred that the holding members be furnished with receiving chambers on their inner sides. The receiving chambers can contain a watertight sealant or a sealant with adhesive properties, preferably an epoxy resin or the like compound.

The sealant with adhesive properties in the context of the invention can include epoxy resins, polyurethane, silicone sealants, etc. Such compositions with sealing and adhesive properties are known in a multitude of versions, and they can be determined without difficulty by one of ordinary skill in the art. In the end, selection of the sealant and sealing-and-glueing composition will also be a function of the selected material of the core member and the edge strips.

In accordance with another aspect of the invention, the edge strip is comprised of a fastening member or assembly, the corner strips, the central strip and, as required, the expansion piece, etc., and with a respective top or cover and decorative laminate or strip.

The fastening member or assembly can be made of aluminum, while the cover or top strip and the decorative strip are made of the same material as the cover plates. Accordingly, the fastening member or assembly contributes to a decorative effect of an edge-protector (keder) on both sides. Moreover, the top strip and the decorative strip are respectively held by the fastening member or assembly in a sufficient distance from the cover plates. Damage of the cover plates by a tool used for attachment need then not be feared, when work is to be done at the edges of the top strip and the decorative strip, after fixing it to the core member.

This applies particularly when the fastening member or assembly extends slightly beyond the cover plates, because then—in a simple manner—a guiding of the tool can be achieved by the fastening member or assembly.

In accordance with a preferred embodiment of one method aspect of my invention, it is contemplated that, as the first step, an edge strip is glued in a full-area manner onto the rim or narrow side of the core member. During forming of the peripheral ledges of the core member, or forming of the grooves in the peripheral ledges of the core member, the glued-on edge strip is simultaneously cut to the size of the width of the central strip. In a subsequent phase, the corner or boundary strips of the edge strips are inserted, or adhered, glued-on, or otherwise attached.

When a composite panel in accordance with the invention is to be produced with a compensating groove, it is preferred that, for dimension-true formation of the first peripheral ledge, the portion of the groove bordering thereat be milled, cut, or similarly shaped. Subsequently, for dimension-true formation of the balance of the compensating groove, milling, cutting, or similar shaping is carried out in the rim or edge of the core member near the other ledge.

A very effective method is attained when the milling tool cuts a strip in one pass, which strip has a width slightly greater than half the width of the compensating groove. It will then be sufficient to have a dual-step milling operation with the milling tool as just indicated.

In accordance with another preferred embodiment of a method of the invention, this includes: after the step of machining or shaping of the compensating groove, the step of inserting the expansion piece in the compensating groove, while spreading the peripheral ledges of the core member to the distance corresponding or related to the upper tolerance limit of the core member; glueing of the edge strip is done simultaneously, or thereafter. Of course other methods of attachment may be used.

In accordance with another preferred feature of the invention after the step of recessing the compensating groove, receiving grooves are produced, first on the upper side, or lower side of the core member, and then into the respective other side. It is also preferred to introduce thereafter, but prior to fastening the edge strip or respectively the corner strips of the edge strip, a sealing medium or a sealing medium plus an adhesive into the receiving grooves.

Also, prior to forming of the peripheral ledges on the core member, the cover plates can be bent about the edges of the core member, for forming the corner strip or strips. Next, they can be glued together with the rim of the core member. During forming of the peripheral ledges of the core member, simultaneously the corner strips of the edge strip can be precisely dimensioned, and after the bringing-in of the compensating groove, the expansion piece, respectively, with the thereon secured central strip of the edge strip, can be inserted into the compensating groove.

In summary it may be stated that the invention uses in one way or other a prefabricated edge strip. The width of this edge strip is either adapted to the actual thickness of the composite panel, or the edge strip is shaped or adjusted in such a way that the thickness of the composite panel can be adapted to the width of the edge strip, at least in the vicinity of the edge or rim of the composite panel.

For reasons related to production and materials, a special importance is attributable to the second named possibility (adaptability) of increasing the thickness of the composite panel at the rim or edge thereof to the thickness which corresponds to the maximum thickness (upper tolerance) of the core member. Furthermore, within the framework of the invention it is elegantly possible to increase the sealing distances or paths at the upper and lower sides of the core member, so that entry of moisture can be prevented more efficiently than has hitherto been feasible with the customary short glue gaps or passages. Finally, the solutions suggested in accordance with another aspect of the invention at least in part allow highly interesting design effects through selection of various materials and colors for the edge protectors, edging bars, corner and central strips for the edge strip, and the like components.

All in all, the production of the composite panel according to the various aspects of the invention obviates the working and/or reworking of the edge strip corners. As well, damage to and jeopardizing of the integrity of the cover plates and/or decorative layers of the cover plates can be systematically prevented.

BRIEF DESCRIPTION OF THE DRAWING

The above and other objects, features and advantages of the present invention will become more readily apparent from the following description, reference being made to the accompanying diagrammatic drawing, in which.

SPECIFIC DESCRIPTION

The invention will be further described by way of several embodiments. The individual Figures of the drawing respectively show the edge or peripheral portion of composite panels in accordance with the teachings of this invention, whereby in all representations of the embodiments the composite panels are systematically or modularly constructed and it is merely an arbitrary definition to designate the left-hand side of the shown composite panels as the upper side.

The drawing shows a composite panel, or plate, or similar structural member. As can be explained with reference to FIGS. 1a and 1b, the composite panel includes a core member, plate, or element, hereinafter referred to as core member, and identified by reference numeral 1 in the drawing.

The composite panel further includes an upper or first cover sheet or cover plate 2, as well as a lower or second cover sheet or cover plate 3. The plates 2 and 3 can be glued to the core member 1.

An edge strip 4 or similar element is provided, as required, at the smaller or narrower sides of the panels, particularly at the narrower sides of the core member 1. The edge strip 4 can be glued to the core member 1. Alternately, it may be secured by clamping action, or it may be fastened in an analogous manner. In all shown embodiments, the edge strip 4 is furnished with rounded, or at least beveled or chamfered, longitudinal edges.

In the embodiments described herein, without being limited thereto, the core member 1 is a board made of wood particles or wood chips, and similar materials. The cover plates 2 and 3 are laminate plates (high-pressure laminate plates—HPL plates according to German Industrial Standard DIN 16926). In most of the embodiments, the edge strip 4 is made of the same material as the cover plates 2 and 3. However, the thickness or height of the edge strip 4 is appreciably greater than that of the cover plates 2 and 3. In some embodiments, the edge strip 4 is at least in part made of aluminum, or another material. The specific material of which the edge strip 4 is made will depend on its use.

The dimensions of the composite panels shown in the drawing may be within the ranges which are customarily used in the art. For example, the thickness of the composite panel is 18 mm with a tolerance or (allowed) deviation of ±0.3 mm, and that of the cover plates 2 and 3 is 0.8 mm with negligible tolerance or deviation. The edge strip 4 has a width of 19.9 mm with negligible tolerances or deviation, and a thickness of 0.5 mm to 0.6 mm, also with negligible deviation or tolerance.

Figures 1A, 1B:
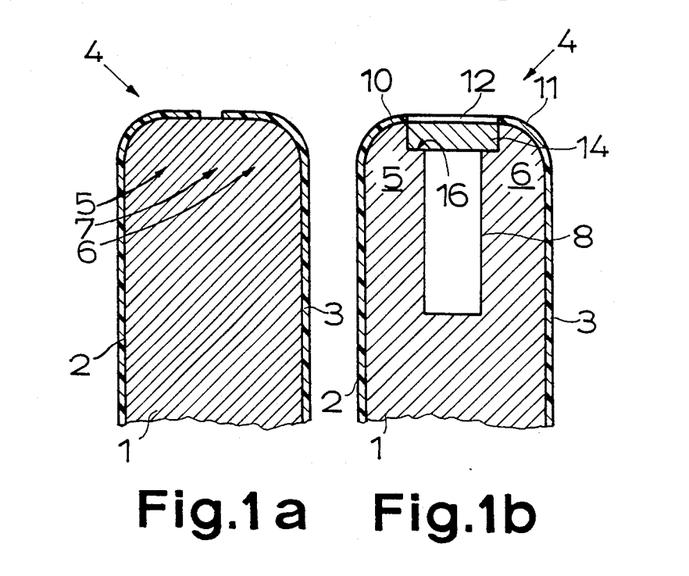
FIG. 1a is a transverse cross section of a first embodiment of a composite panel, during an intermediate production phase, and in which extended cover plates are used as edge protectors.
FIG. 1b is a view similar to FIG. 1a of the composite panel in accordance with a final production phase.

FIGS. 1a and 1b schematically show the production of a composite panel, wherein FIG. 1a is representative of an intermediate production phase or stage. The cover plates 2 and 3 extend from the respective parallel surfaces of the core member 1 around the rounded edges to reach the abutting stage indicated in FIG. 1a. The distance between the abutting ends of the cover plates, when viewed in cross section, is predetermined. As shown, the gap or separating distance is approximately at the center of the core plate or member 1. The ends of the cover plates are respectively glued to the ledge portions 5 and 6, i.e. the outer regions near the corners of the core member 1 when viewed in cross section.

The cover plates 2 and 3 form corners or corner strips, with the upper or first cover plate 2 forming an upper or first edge strip or corner strip 10, and the second or lower cover plate 3 forming a lower or second edge strip or corner strip 11. Accordingly, in combination and with reference to the narrow side of the core member 1 the corner strips 10 and 11 form an edge strip 4.

FIG. 1b shows a final phase of the fabrication of a composite panel. The central strip 12 of the edge strip 4 is associated with an intermediate component 7 which is disposed between the upper leg or ledge 5 and the lower leg or ledge 6 of the core member 1. It is also indicated that the intermediate component 7 of the core member 1 is a compensating groove 8. It is further clear that the corner strips 10 and 11, and the central strip 12 are separate and distinct elements.

It is further noted that an expansion piece 14 is introduced into the compensating groove 8. This compensating groove, as mentioned, forms the intermediate component 7 of the core member 1. In this example, the central strip 12 of the edge strip 4 is directly glued to the expansion piece 14. The width of the expansion piece 14 is in agreement with the width of the intermediate component, or compensating groove. The width of the compensating groove, in turn, is a function of the upper tolerance limit of the core member 1. This tolerance limit is also referred to as the threshold level hereinafter.

Specifically, this means that when the thickness of the core member 1 is just near the upper threshold level, the expansion piece 14 will be positioned with a so-called snug fit in the compensating groove 8 of the core member 1. In other cases, a minor expansion of the compensating groove 8 by the expansion piece 14 would actually occur.

FIGS. 1a and 1b also indicate how this panel will be manufactured. Initially, the cover plates 2 and 3 are bent around the rounded edges or corners of the core member, approximately to the middle of the narrow side of the core member 1. Next, they are glued to the narrow side. Thus, the corner strips 10 and 11 of the edge strip 4 are formed. The compensating groove 8 is then milled into the narrow side of the core member 1. Milling, of the compensating groove, is started at the lower ledge 6 and is with negligible tolerance. The upper ledge 5 is formed during milling of the balance of the compensating groove 8. The width of the compensating groove 8 will vary in accordance with the tolerance limits of the core member 1. Forming of the ledge portions 5 and 6 of the core member 1 serves to precisely and simultaneously dimension the corner strips 10 and 11 of the edge strip 4.

After the compensating groove 8 has been formed, the intermediate component 7—which is provided by the compensating groove 8—is widened by the expansion piece 14 to achieve a dimension which is related to the upper threshold level of the core member, i.e. the final width of the compensating groove 8 is a function of an upper tolerance limit of the thickness of the core member 1. This means that the peripheral ledges 5 and 6 of the core member 1, as well as the corner strips 10 and 11 are spread together at the same time by the expansion piece 14 to be spaced at a distance in conformity with the upper tolerance limit.

The central strip 12 which is glued to the expansion piece 14 in a prior step is positioned or seated precisely between the corner strips 10 and 11 of the edge strip 4.

The shoulder or step 16 of the compensating groove 8 prevents the expansion piece 14 from being involuntarily pressed too deep into the compensating groove 8. The height of the shoulder or step 16 also would have a negligible tolerance so that no undesired projections, steps, and similar irregularities arise between the corner strips 10 and 11, and the central strip 12.

Figures 2A, 2B:
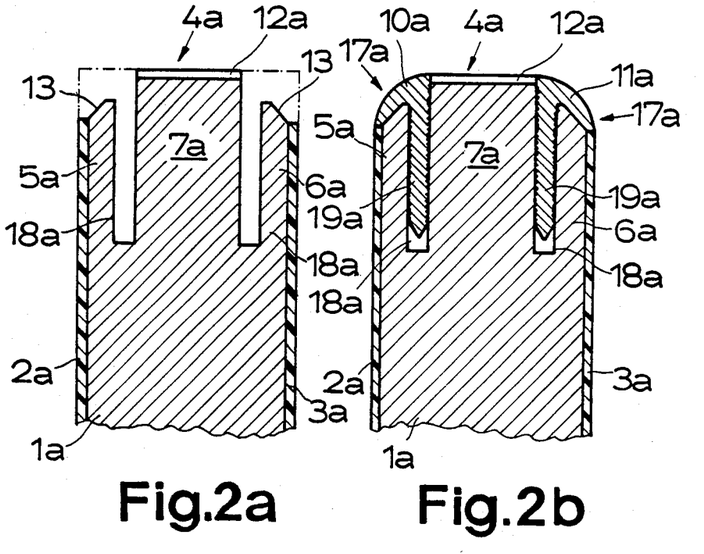
FIG. 2a is also a transverse cross section of a second embodiment of a composite panel according to the invention in an intermediate production phase.
FIG. 2b is a view similar to FIG. 2a showing a final production phase.

The embodiment of the composite panel shown in FIGS. 2a and 2b includes an edge strip 4a which has corner strips 10a and 11a extending toward the center, i.e. the interior of the panel. The width of the corner strips 10a and 11a has a negligible tolerance. Furthermore, the edge strip 4a includes a central strip 12a. The core member 1a includes an upper peripheral ledge 5a and a lower peripheral ledge 6a which each are formed so as to have a precise thickness. The core member 1a further includes an intermediate component 7a. The thickness of the peripheral ledges 5a, 6a of the core member 1a is precisely adapted to the width of the corner strips 10a and 11a of the edge strip 4a, i.e. in the shown embodiment, the thickness of the peripheral ledges 5a and 6a of the core member 1a plus the thickness of the cover plates 2a and 3a is identical to the width of the corner strips 10a and 11a of the edge strip 4a, whereby tolerances are negligibly small here.

The production tolerance for the core member 1a is fully effective or compensated at the intermediate component 7a of the core member 1a. From the embodiment shown in FIG. 2, it is clear that the corner strips 10a and 11a and the central strip 12a of the edge strip 4a are separate and individual elements.

The corner strips 10a and 11a of the edge strip 4a are formed as edge protectors which are rounded and thereby present the composite panel with rounded edges or rims. These corner strips 10a and 11a are also adapted to provide increased opportunities for achieving special design effects through selection from various colors and materials.

FIG. 2a also clearly shows that the peripheral ledges 5a and 6a are shaped so as to form, at least with the intermediate component 7a, an inverted L-shape. The groove includes the vertical leg 18a and the transverse leg 13. The configuration of the corner strips 10a and 11a is complementary to this inverted L-shaped groove. These two corner strips 10a and 11a have dependent legs 19a, which serve as fastening bars, and which may be provided with grooves or with a similar corrugation to ensure retention in the groove 18a.

As will be explained further below, the corner strips 10a and 11a are also connected by way of a tongue and groove connection 17a to the core member 1a.

FIG. 2a further shows that the central strip 12a of the edge strip 4a is glued to the intermediate component 7a of the core member 1a, and is made of the same material as the cover plates 2a and 3a.

The production sequence indicated in FIGS. 2a and 2b clearly indicates that upper and lower peripheral ledges 5a and 6a are produced, i.e. such that the upper peripheral ledge 5a can support the cover plate 2a, and the lower peripheral ledge 6a can support the lower cover plate 3a. Forming, by milling and the like operation, of the upper ledge 5a on the one hand commences from the side of the upper cover plate 2a, and forming of the lower ledge 6a on the other hand commences from the side of the lower cover plate 3a. The thickness of the peripheral ledges is in accordance with or related to the edge strip 4a and with negligible tolerance.

The central strip 12a is first glued onto the respective surface of the core member 1a. This glueing is referred to at times as full-surface-glueing, whereby the term full-surface refers generally to the surface schematically represented by the dash-dot line in FIG. 2a. Subsequently, during production of the peripheral ledges 5a and 6a and during formation of the groove or chamfer 13 into the core member 1a, the edge strip 4a, i.e. the central strip 12a, is cut to size at the same time. Next, the corner strips 10a and 11a are assembled in the respective grooves, and they are also secured by glue or a similar adhesive to the core member 1a.

As a result, the intermediate component 7a of the core member 1a and the central strip 12a of the edge strip 4a are just as wide as is prescribed by the original thickness of the core member 1a. Also, because the thickness of the core member fluctuates from case to case, the width of the intermediate component 7a and the central strip 12a fluctuates from case to case as well.

Figure 3A:
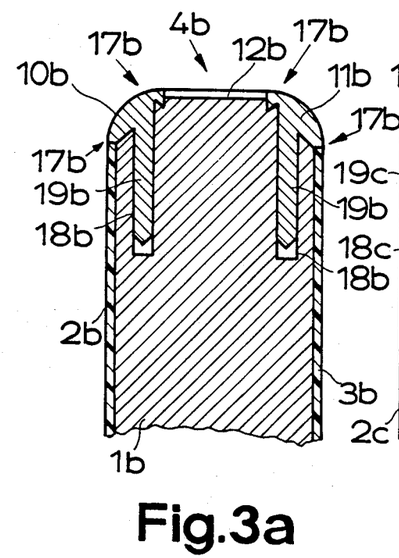
FIG. 3a is a transverse cross section of an embodiment which represents a modification of an edge strip assembly according to FIG. 2b, shown in a final production phase.
Figure 3B:
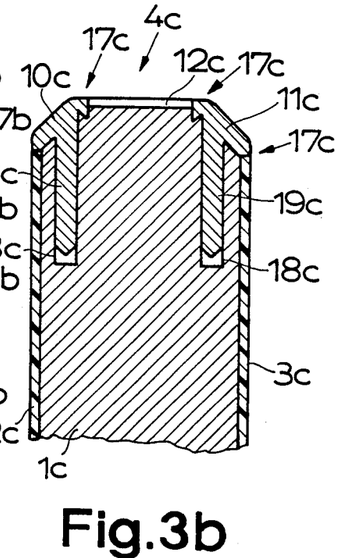
FIG. 3b is a transverse cross section of the edge strip assembly of FIG. 2b, also shown in a final production phase.

FIGS. 3a and 3b show modifications of the embodiment shown in FIG. 2b. Thus, in general terms, two edge strip configurations are shown, with the edge strips being secured in grooves at the peripheral ledges. Other details of the embodiments shown in FIGS. 2a, 2b, 3a and 3b will be discussed further below.

A specific inventive detail is shown in FIGS. 3a and 3b. With reference to FIG. 3a the composite panel includes a core member 1b with cover plates 2b and 3b and with an edge strip 4b. The core member 1b includes grooves 18b. The edge strip 4b is comprised of a central strip 12b and two corner strips 10b and 11b. The corner strips are furnished with dependent legs 19b which are inserted in the grooves 18b of the core member 1b. The two corner strips 10b and 11b are connected further to the core member 1b by way of a tongue-and-groove connection 17b. Thus, the tongue-and-groove connection 17b or a like (e.g. dove-tail) connection, is formed in a symmetrical manner on both sides of the core member 1b by cooperation of the corner strips 10b and 11b of the edge strip 4b with the respective peripheral ledges 5b and 6b of the core member 1b, and with respective cover plates 2b and 3b as required.

The connection 17b serves to wedge together, or provide a similar tight connection between the corner strips 10b and 11b of the edge strip 4b with the respective peripheral ledges 5b and 6b of the core member 1b. The grooves or keyways of the connection 17b are preferably provided in or at the core member 1b. Furthermore, the respective members of the connection 17b are shaped in the form of wedges or similar conical connection or inclined connection elements.

The connection shown as 17b and 17c in FIGS. 3a and 3b is also employed in the embodiments shown in FIGS. 2b, 4a, 8b, 9b, 10b and 11b. In such embodiments, the connection is not always conical or wedge-like, and the keyways or grooves of the connection are provided at times in the cover plates, rather than in the core member.

The embodiments in FIGS. 3a and 3b also show that the edge strips 4b and 4c and, more specifically, the corner strips 10b, 10c and 11b, 11c are furnished with respective fastening bars 19b and 19c, respectively, or similar dependent legs. Such fastening bars are also employed in the embodiments shown in FIGS. 2b, 4a, 10b and 11b.

With reference to FIG. 3b the composite panel includes a core member 1c with cover plates 2c and 3c and with an edge strip 4c. The core member 1c includes grooves 18c. The edge strip 4c is comprised of a central strip 12c and two corner strips 10c and 11c. The corner strips are furnished with dependent legs 19c which are inserted in the grooves 18c of the core member 1c. The two corner strips 10c and 11c are further connected to the core member 1c by way of a tongue-and-groove connection 17c.

Next, a further embodiment of the composite panel in a first and a second version will be explained with reference to FIGS. 4a and 4b. These embodiments are generally comprised of similar components as the embodiment shown in FIGS. 2a and 2b. Accordingly, similar elements have been identified with the reference numerals of FIGS. 2a and 2b and to these is added the letter code of the specific embodiment, i.e. "d" for FIG. 4a and "e" for FIG. 4b.

Figure 4A:
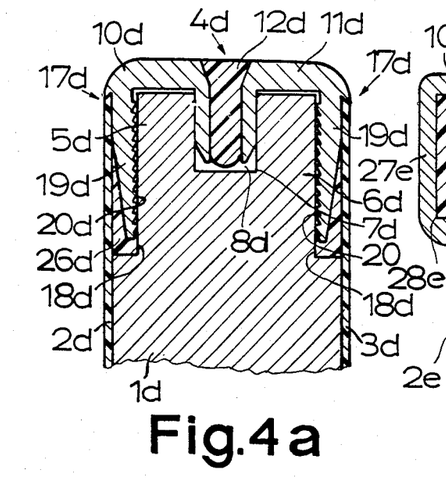
FIG. 4a is a transverse cross section of a third embodiment of a composite panel according to the invention, including a separate central strip.

Due to the general similarities, the embodiment shown in FIG. 4a includes a core member 1d and cover plates 2d and 3d. The core member 1d has peripheral ledges 5d and 6d which are separated by the intermediate component 7d, which is formed by the groove 8d.

The edge strip 4d is comprised of corner strips 10d and 12d which have a cross-sectional configuration which is somewhat similar to that of the inverted letter "U". The central strip 12d is provided by a filling of a settable epoxy resin, or similar material. The dependent legs 19d, which act as fastening bars, are provided with serrations, corrugations, and/or similar means adapted to act in a manner of a barbed hook. This is generally identified at 20d. The edge strip 4d is secured by a tongue-and-groove connection generally identified at 17d. The dependent legs or fastening bars 19d are secured in grooves 18d and these may be filled with a sealant or sealant and adhesive generally indicated by the reference code 26d.

Figure 4B:
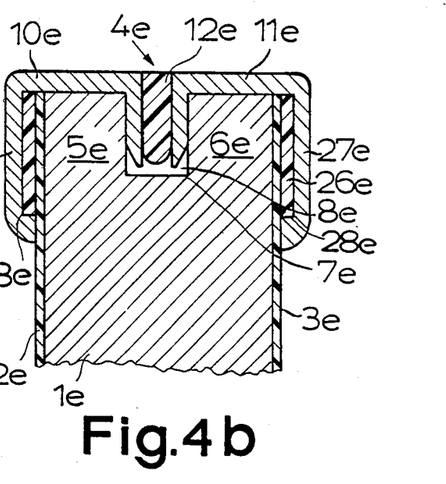
FIG. 4b is a transverse cross section of a further embodiment of a composite panel with a separate central strip.

FIG. 4b shows an embodiment which is generally similar to that of FIG. 4a, but wherein the dependent legs 27e of the corner strips 10e and 11e, which are part of the edge strip 4e, are generally arranged exteriorly with respect to the cover plates 2e and 3e of the core member 1e. The edge strip 4e includes a separate central strip 12e also made of epoxy resin or the like material. Most of the central strip 12e and of the central and dependent leg portions of the corner strips 10e and 11e is disposed in the compensating groove 8e, which forms the intermediate component 7e between the peripheral ledges 5e and 6e. The holding bars or exterior dependent legs 27e are adapted to form a receiving chamber 28e for a sealant or sealant and adhesive 26e.

It is of note in the embodiments in FIGS. 4a and 4b that the central strips 12d and 12e are made of an epoxy resin which can harden or cure. The respective width of the central strips 12e and 12d, which form part of the respective edge strips 4d and 4e, varies from case to case, and this variation is particularly elegantly considered by the specific filling or filler which forms such central strips.

Furthermore, the corner strips are made as U-shaped elements, when viewed in cross section. These elements can provide rounded corners for the respective edges, and they can be slipped, as it were, onto the ledges of the respective core member. It is also important that the two corner strips are identical in configuration so that they can be cut from a continuous and standard length to the specific length required for an assembly at hand.

Further details relating to the configuration of these embodiments will be discussed further below.

With respect to the method of making the composite panels suggested in FIGS. 4a and 4b, it is to be noted that the compensating grooves 8d and 8e form the intermediate components 7d and 7e. Because the methods are similar only one is described with reference to FIG. 4a.

Initially, for precise production of the first peripheral ledge 5d or 6d, respectively, an initial portion of the compensating groove 8d is milled, or otherwise produced, which portion is adjacent to the first peripheral ledge 5d or 6d, respectively. Subsequently, for the precise production of the second peripheral ledge 6d or 5d, respectively, the balance of the compensating groove 8d is milled, or otherwise introduced in the peripheral portion of the core member 1d.

The corner strips 10d and 11d of the edge strip 4d are clipped onto the peripheral ledges 5d and 6d of the core member 1d. Subsequently, the filling or curable epoxy resin, which forms the central strip 12d is introduced into the respective recesses or grooves.

The embodiment of the composite panel shown in FIG. 4a also shows a further feature of the invention. Thus, the fastening bars 19d of the corner strips 10d and 11d are furnished with serrations, formations, and similar projections which are adapted to wedge the fastening bars 19d in the grooves 18d of the core member 1d.

It is also of note that the grooves 18d are provided at the upper and lower sides of the core member 1d. It is preferred that the method proceeds in such a way that these grooves 18d are made after the production of the compensating groove 8d. Subsequently, the cover plates 2d and 3d are glued down. The latter applies at least for the region which is adjacent to the edge of the core member 1d.

In contrast, the embodiment of FIG. 4d has no receiving grooves, but is furnished with holding bars 27e. The holding bars 27e form receiving chambers 28e with respect to the cover plates 2e and 3e for receiving and retaining a sealant and/or sealant with adhesive properties 26e.

Figure 5A:
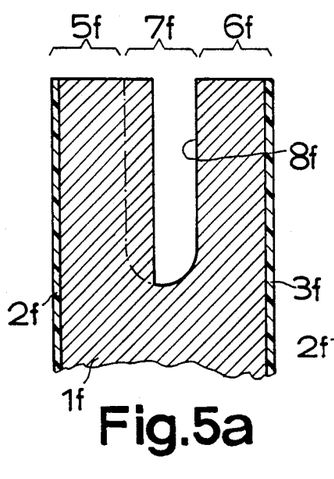
FIG. 5a is a transverse cross section of a fourth embodiment of a composite panel with a compensating groove, and representing an intermediate production phase.
Figure 5B:
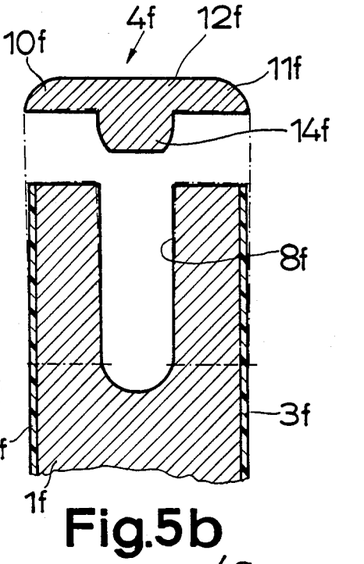
FIG. 5b shows the embodiment of FIG. 5a in a final production phase with a unitary edge strip prior to final assembly.

The embodiment of the composite panel shown in FIGS. 5a and 5b represents a further departure from the constructive embodiments described above.

The edge strip 4f is a unitary structure composed of the edge strips 10f and 11f, and the central strip 12f. In other words, the edge strip 4f is a single element which has corner strips 10f and 11f and a central strip 12f. The intermediate component 7f of the core member 1f is in the form of a compensating groove 8f which is centrally arranged in the edge of the core member 1f between the peripheral ledges 5f and 6f, as is shown in the cross section thereof. In analogous manner to that of FIG. 1b, the central strip 12f of the edge strip 4f exhibits an expansion piece 14f. The expansion piece 14f is also introduced in the compensating groove 8f which forms the intermediate component 7f of the core member 1f. The width of the expansion piece 14f corresponds to the width of the intermediate component 7f, or compensating groove 8f, respectively, which width, in turn, is a function of the upper tolerance limit of the core member 1f. This expansion is made clear in dash-dot lines in FIG. 5d, in contrast to the solid lines.

Production or assembly of this panel embodiment is done such that at the edge of the core member 1f, measuring from the cover plate 3f on the lower side of the panel, the peripheral ledge 6f is formed with a predetermined thickness and with a negligible tolerance. This is done by milling, cutting, or otherwise forming that part of the compensating groove 8f which is adjacent to this peripheral ledge 6f into the edge or rim of the core member 1f (compare FIG. 5a). For precise forming of the other peripheral ledge 5f of the core member 1f, the balance of milling of the compensating groove 8f is carried out into the core member 1f near the upper cover plate 2f.

From case to case, the compensating groove 8f will vary, in accordance with the tolerance limits of the core member intermediate component 7f—which is provided by the compensating groove 8f—is widened by the edge strip, particularly the expansion piece 14f thereof, to a thickness or width which corresponds to the upper tolerance limit or threshold level of the core member. More particularly, this is achieved by introduction of the expansion piece 14f into the compensating groove 8f, and the peripheral ledges 5f and 6f of the core member 1f are moved so as to attain a separating distance corresponding to the upper tolerance limit of the core member 1f. At the same time, the edge strip 4f will be glued to the core member 1f.

Accordingly, irrespective of the actual thickness of the core member 1f, in this manner an exact agreement of the width of the edge strip 4f is always achieved with the width of the core member 1 inclusive of the cover plates 2f and 3f at the peripheral region. In this way, irregularities such as steps or undesired gaps are prevented. The small expansion of the core member 1f with the cover plates 2f and 3f is so little within customary tolerance limits that it does not disrupt.

Figures 6A, 6B:
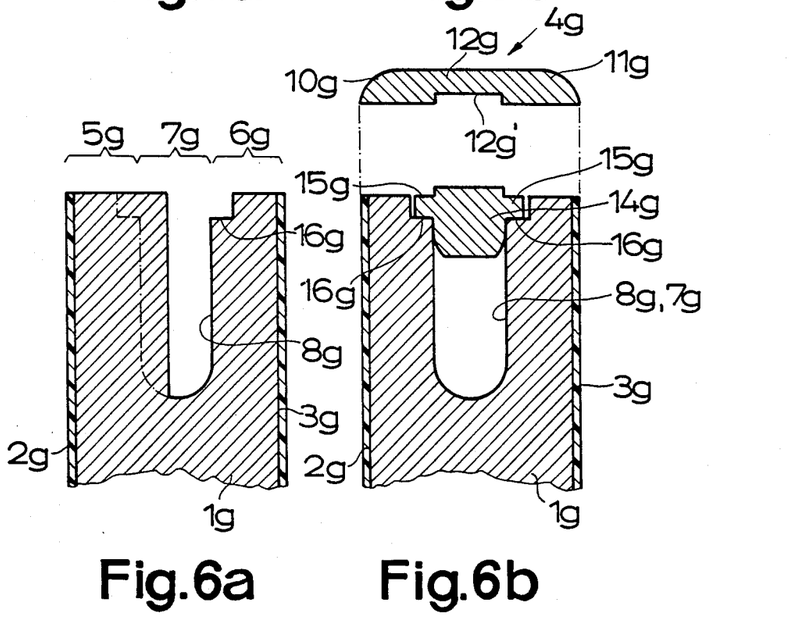
FIG. 6a is a transverse cross section of a modification of the embodiment of FIG. 5a and includes a shoulder portion for the compensating groove, in an intermediate production phase.
FIG. 6b shows an edge strip and an expansion piece for the panel of FIG. 6a prior to assembly of the components.

A separate expansion piece 14g is used in the embodiment shown in FIGS. 6a and 6b. This embodiment is otherwise similar to that shown in FIGS. 5a and 5b.

The edge strip 4g has corner strips 10g and 11g. Furthermore, the edge strip 4g includes a central groove 12g'. The core member 1g includes an upper peripheral ledge 5g and a lower peripheral ledge 6g. The core member 1g further includes an intermediate component 7g—which is provided by the compensating groove 8g. The compensating groove 8g is widened by shoulders 16g.

The expansion piece 14g is furnished with support flanges 15g or similar projections which are adapted to be seated or to rest on the shoulders 16g with a predetermined amount of undercut.

The method of making the composite panel according to FIGS. 6a and 6b includes at least some of the principles described with respect to FIGS. 5a and 5b. One difference resides therein that initially only the expansion piece 14g is introduced into the compensating groove and, more particularly, seated on the shoulders 16g with the shoulders 15g, and is then glued as required. The edge strip 4g can then be clamped onto the expansion piece 14g by way of the groove 12g'. This composite panel also has cover plates 2g and 3g.

This embodiment provides the opportunity to select a first material for the edge strip and a second material for the expansion piece, whereby the edge strip is not limited by the design and mechanical requirements which apply to the expansion piece.

Figure 7A:
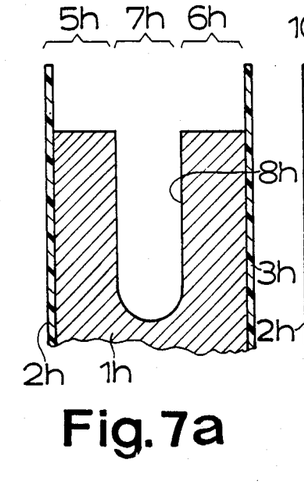
FIGS. 7a, 7b and 7c show a production sequence of a modification of the composite panel suggested in FIG. 5b.
Figure 7B:
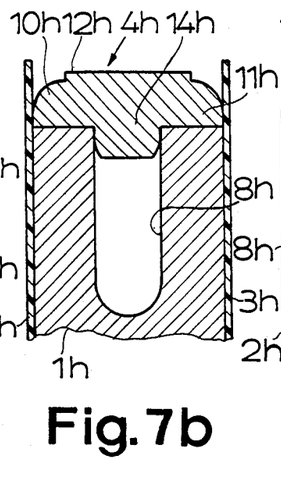
Figure 7C:
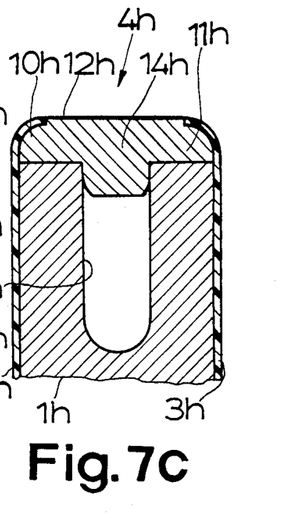

FIGS. 7a, 7b and 7c show that also in the presence of an edge strip 4h, with an expansion piece 14h, the cover plates 2h and 3h may be extended around the peripheral edges or corners of the core member 1h.

The edge strip 4h has corner strips 10h and 11h, and the edge strip 4h includes a central strip 12h. The core member 1h includes an upper peripheral ledge 5h and a lower peripheral ledge 6h. The core member 1h further includes an intermediate component 7h—which is provided by the compensating groove 8h.

The cover plates 2h and 3h may be extended around the respective edges of the core member 1h by extending for a predetermined distance beyond the core member 1h, as is indicated in FIG. 7a. In addition, the edge strip 4h has a central strip 12h which extends above the corner strips 10h and 11h, to form, as it were, a stepped portion with a height corresponding to the thickness of the cover plates 2h and 3h. Thus, the respective upper surface of the cover plate 2h and of the cover plate 3h will be flush with the upper surface of the central strip 12h, as is indicated in FIG. 7c. It will be obvious that the cover plates 2h and 3h are to be glued here to the corner strips 10h and 11h of the edge strip 4h.

The embodiments of a composite panel shown in FIGS. 8 to 12 have certain similarities with the embodiment shown in FIGS. 5a and 5b. The differences are described in greater detail below.

Figures 8A, 8B:
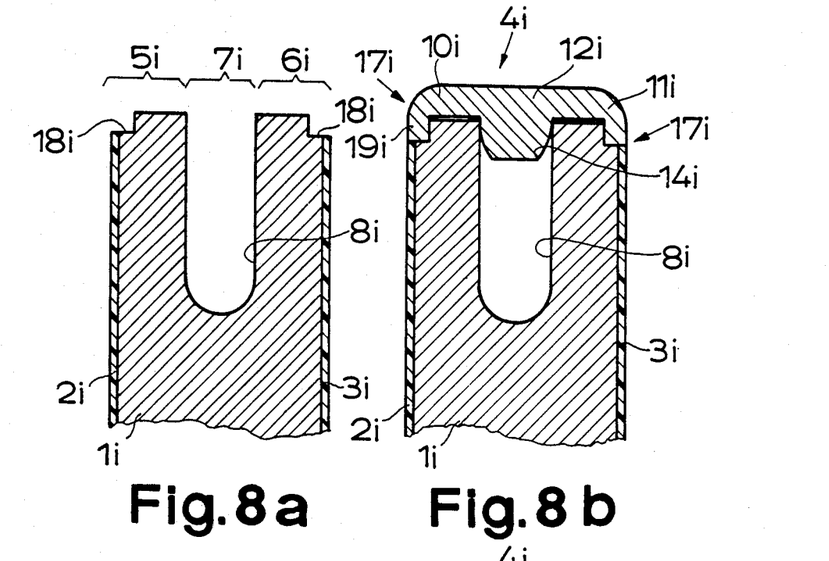
FIGS. 8a and 8b show a production sequence of a further modification of the edge strip for the composite panel suggested in FIG. 5b.

With reference to FIGS. 8a and 8b, the composite panel includes a core member 1i with cover plates 2i and 3i, and with an edge strip 4i. The core member 1i includes a compensating groove 8i between peripheral ledges 5i and 6i. The compensating groove forms the intermediate component 7i. The edge strip 4i is comprised of a central strip 12i and two corner strips 10i and 11i. The corner strips are furnished with short dependent legs 19i which are seated in the recesses 18i of the core member 1i. The edge strip 4i is connected to the core member 1i by way of a tongue and groove connection 17i and an expansion piece 14i.

Modifications of the expansion piece of the edge strip and the configuration of the compensating groove of the core member are shown in FIGS. 9a, 9b, 10a, 10b, 11a, 11b and 12.

Figures 9A, 9B:
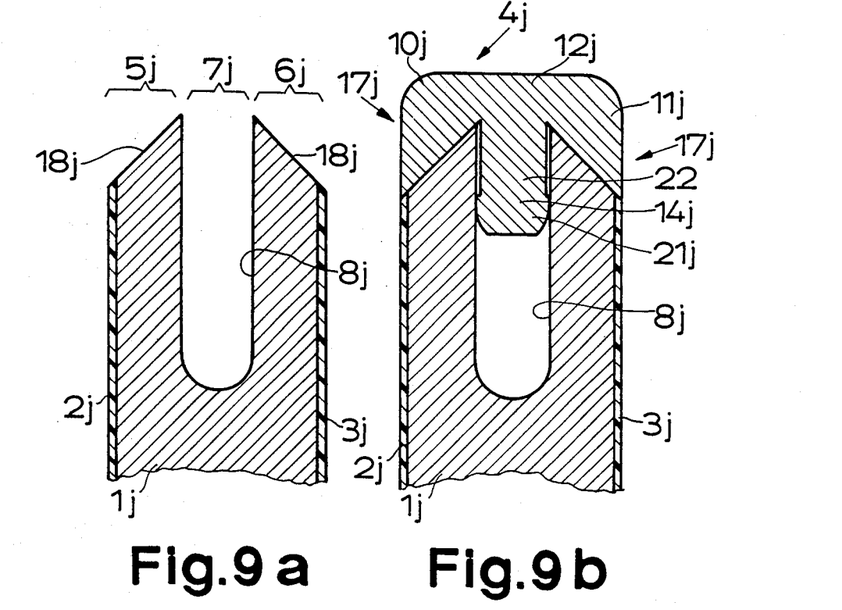
FIGS. 9a and 9b show a production sequence with a wedge-like edge strip for the composite panel suggested in FIG. 5b.

Turning to FIGS. 9a and 9b, the composite panel includes a core member 1j with cover plates 2j and 3j, and with an edge strip 4j. The core member 1j includes a compensating groove 8j between peripheral ledges 5j and 6j. The compensating groove forms the intermediate component 7j. The edge strip 4j is unitarily comprised of a central strip 12j and two corner strips 10j and 11j. The corner strips 10j and 11j are furnished with beveled dependent legs 19j which are seated on the wedge-like projections 18j of the core member 1j. The edge strip 4j is connected to the core member 1j by way of a tongue and groove connection 17j and an expansion piece 14j.

It is clear from FIG. 9b that the expansion piece 14j of the edge strip 4j has an expansion head 12j. This expansion head 21j defines the nominal or blueprint dimension of the compensating dimension. The expansion head 21j is connected to a shaft or similar member 22j which is furnished with an undercut and/or similar reduction in width. In conjunction with the wedge-like tongue and groove connection 17j a tight connection, a clamping as it were, can be attained between the edge strip 4j and the core member 1j.

Particularly when compared with FIG. 8a, smallest and unavoidable tolerances can be leveled, compensated or adjusted with the assembly shown in FIG. 9b.

Figure 10A:
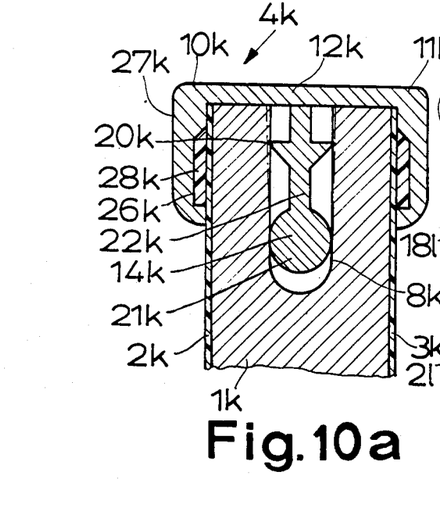
FIGS. 10a and 10b show two embodiments of an edge strip with integral expansion piece.

With reference to FIG. 10a, the composite panel includes a core member 1k with cover plates 2k and 3k, and with an edge strip 4k. The core member 1k includes a compensating groove 8k. The edge strip 4k is comprised of a central strip 12k and two corner strips 10k and 11k. The corner strips are unitarily furnished with exterior dependent legs 27k, or similar holding bars, which are respectively secured on the cover plates 2k and 3k by a sealant with adhesive properties 26k in a receiving chamber 28k. The edge strip 4k is connected to the core member 1k, and an expansion piece 14k is provided.

The expansion piece 14k of FIG. 10a includes a spherical expansion head 21k which is connected to the central strip 12k by way of a shaft 22k or similar bar, rod, and the like. The shaft is furnished with projections, formations, and the like generally designated by the reference code 20k, which are adapted to be wedged into place like barbed hooks, for providing a wedged connection between the expansion piece 14k and, accordingly, the edge strip 4k in the core member 1k.

Figure 10B:
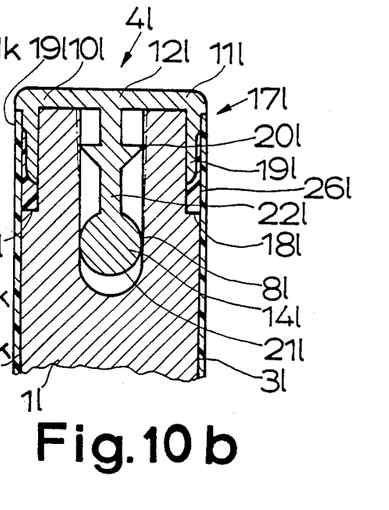

The composite panel in FIG. 10b includes a core member 1l with cover plates 2l and 3l, and with an edge strip 4l. The core member 1l includes a compensating groove 8l. The edge strip 4l is comprised of a central strip 12l and two corner strips 10l and 11l. The corner strips are integrally furnished with dependent legs 19l, or similar fastening bars, which are secured by a sealant with adhesive properties 26l in the recesses 18l of the core member 1l. The edge strip 4l is connected to the core member 1l by way of a tongue and groove connection 17l and a special expansion piece 14l.

The expansion piece 14l of FIG. 10b also includes a spherical expansion head 21l which is connected to the central strip 12l by way of a shaft 22l or similar bar, rod, and the like. The shaft 22l is furnished with projections, generally designated by the reference code 20l, and these are adapted to be wedged into place like barbed hooks, for providing a wedged connection between the expansion piece 14l and, accordingly, the edge strip 4l in the core member 1l.

Figure 11A:
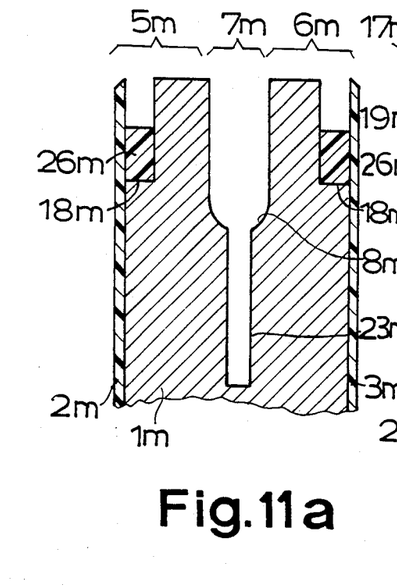
FIGS. 11a and 11b show a production sequence of a composite panel with sealant and adhesive in grooves near the ledges and with a further embodiment of an integral expansion piece for the edge strip.
Figure 11B:
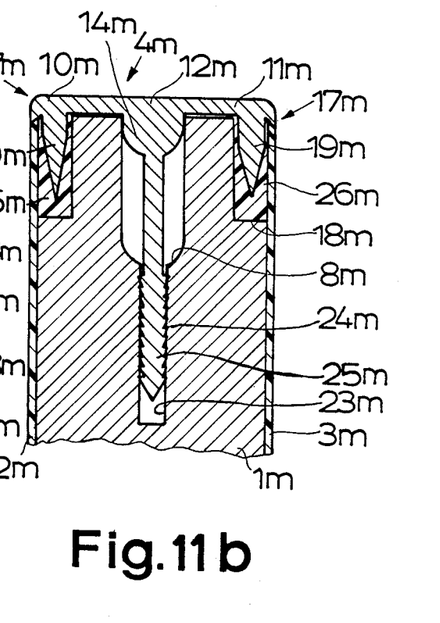
Figure 12:
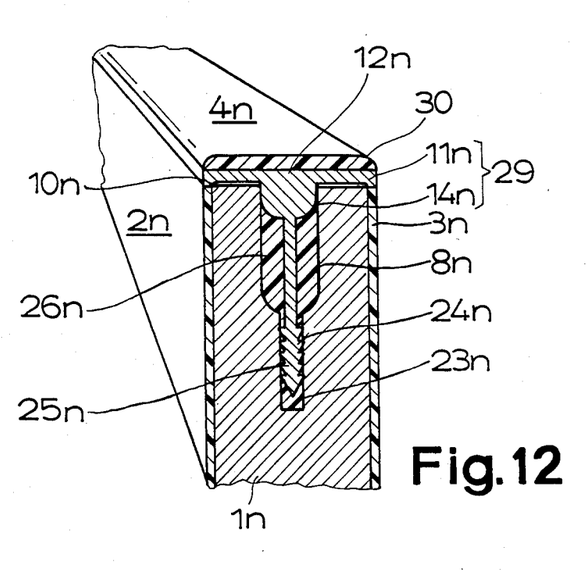
FIG. 12 is a perspective view of a composite panel with a fastening assembly.

FIGS. 11b and 12 show preferred embodiments of a composite panel wherein the compensating groove 8m, 8n is extended interiorly into the core member 1m, 1n by a fastening opening, for example a bore or groove. The complementary expansion piece 14m, 14n is provided with a fastening strip 25m, 25n which can be introduced into the fastening opening 23m, 23n. The fastening strip 25m, 25n is equipped with projections, and similar inclined formations generally designated at 24m, 24n, and these can be wedged into place like barbed hooks, for providing a wedged connection of the fastening strip 25m, 25n in the opening 23m, 23n.

More specifically, the composite panel in FIGS. 11a and 11b includes a core member 1m with cover plates 2m and 3m, and with an edge strip 4m. The core member 1m includes a compensating groove 8m between the peripheral ledges 5m and 6m, and the intermediate component 7m is provided by the compensating groove 8m. The edge strip 4m is comprised of a central strip 12m and two corner strips 10m and 11m. The corner strips are furnished with dependent legs 19m, or similar fastening bars, which are secured by a sealant with adhesive properties 26m in the recesses 18m of the core member 1m. The edge strip 4m is connected to the core member 1m by way of a tongue and groove or similar connection 17m and a special expansion piece 14m located at the central stip 12m.

The compensating groove 8m is extended interiorly into the core member 1m by a fastening groove or slot 23m. The complimentary expansion piece 14m is furnished with a fastening strip 25m which can be introduced into the opening 23m. The fastening strip 25m is equipped with projections 24m, and these are adapted to be wedged into place like barbed hooks, for providing a wedged connection of the fastening strip 25m in the groove 23m.

The composite panel in FIG. 12 includes a core member 1n with cover plates 2n and 3n, and with an edge strip 4n. The core member 1n includes a compensating groove 8n. The edge strip 4n is unitarily comprised of a fastening member, strip, or assembly 29 with two corner strips 10n and 11n, and the central strip 12n, the expansion piece 14n, the fastening bar 25n and a top or cover and decorative strip 30. The fastening assembly 29 may be made of aluminum, while the top and decorative strip 30 is made of the material of the cover plates 2n and 3n.

This embodiment achieves the decorative effect by way of the fastening assembly 29 which is in the form of a double-sided protective edge protector (keder).

Furthermore, the top and decorative strip 30 is held by the fastening assembly 29 at a sufficient distance with respect to the cover plates 2n and 3n. When working or reworking of the edges of the top and decorative strip 30, after securing it on the core member 1n, damage to the cover plates 2n and 3n by the respective tool need not be feared. This applies particularly in the case when the fastening assembly 29 extends laterally slightly beyond the cover plates 2n and 3n. The respective tool can be be guided simply and easily by the fastening assembly 29.

As is further shown in FIG. 12, the compensating groove 8n and/or the fastening groove 23n may be filled with a sealant or sealant with adhesive properties 26n when dictated by the circumstances for fastening the respective parts.

The following description also relate to common features of various embodiments discussed above. The particular reference numeral of the elements discussed is shown in brackets "( )" and in the associated FIG. the element carries as well the respective letter code of the embodiment.

A first common feature of the embodiments shown in FIGS. 4a, 10b and 11b concerns the provision of grooves (18) at the upper and lower sides of the core member (1) directly near the cover plates (2) and (3). This groove (18) is filled with a watertight sealant, or a sealant with adhesive properties (26). The standard compositions are contemplated for this (26), for example epoxy resins, urea-based resins, and the like. A pure sealant may be used when the securement of the edge strip (4) to the core member (1) is otherwise accomplished. It is essential in this context that the path or distance of sealing, from the upper side—or lower side—of the composite panel to the core member (1) is increased when using such sealant or a sealant with adhesive properties. This is for positively preventing entry of water or moisture into the core member (1). Such measure is of primary importance when the core member (1) is a chip board made of wood chips which would tend to swell when moisture enters.

One common feature of the composite panels shown in FIGS. 4b and 10a resides therein that the corner strips (10 and 11) of the edge strip (4) have holding bars (27) which respectively extend onto the upper and lower sides of the cover plates (2 and 3). These holding bars (27) are furnished in the named embodiments with interior receiving chambers (28) for the sealant or sealant with adhesive properties (26). Accordingly, the desired lengthy sealing distances are realized on the exterior faces or sides of the composite panel. The edge strips (4) embrace, as it were, the cover plates (2 and 3). It is then advantageous to round the free edges of the holding bars (27). It will also be obvious that the grooves (18) and/or the receiving chambers (28) need to be filled with the sealant and/or adhesive (26) prior to securing the edge strip (4) and/or the corner strips (10 and 11) thereof at the core member (1).

I claim:

1. A composite panel comprising:
a core member including:
a first substantially planar surface,
a second substantially planar surface,
said first and second planar surfaces extending substantially parallel to one another at a predetermined distance corresponding to a thickness of said core member with fabrication tolerances between an upper and lower limit, opposed and peripheral narrow sides being disposed therebetween, and
at least one cover plate secured to said core member on at least one of said surfaces thereof;
at least two peripheral ledges formed at least at one of the said narrow sides of said core member of predetermined widths with negligible tolerances, with one ledge being arranged near said first planar surface, and the other ledge being arranged near said second planar surface, an intermediate zone formed by a compensating groove being provided between said peripheral ledges, the thickness of said ledges between said compensating groove and a respective one of said first and second surfaces being precisely set and resulting in the full fabrication tolerances of the core member being encompassed within the width of the compensating groove;
an edge strip for covering said at least one narrow side, said edge strip being formed of a central strip, which corresponds in width to the width of the intermediate zone and corner strips that correspond in width to the width of the ledges and are secured thereover, said central strip being formed by a hardened epoxy resin which fills a gap between said corner strips.

2. The composite panel defined in claim 1, wherein said core member includes a plurality of receiving grooves, and further comprising:
at least one of said strips having at least one fastening projection or fastening bar that is insertable in the respective receiving grooves.

3. The composite panel defined in claim 2, wherein said core member includes a predetermined number of receiving grooves, and wherein at least one receiving groove is respectively arranged at the upper side and the lower side of said core member and directly under the respective cover plate, and further comprising an adhesive resin filling said receiving grooves.

4. The composite panel defined in claim 2, wherein the corner strips are generally U-shaped when viewed in cross section.

5. The composite panel defined in claim 1, wherein at least one of said corner strips includes a holding bar which projects inwardly near a respective one of said planar surfaces, said holding bar having at least one rounded edge, said holding bar includes a receiving chamber on a side thereof which is turned toward said one of said surfaces, and a sealant in said chamber.

6. The composite panel defined in claim 5, wherein the corner strips are generally U-shaped when viewed in cross section.

7. The composite panel defined in claim 1, wherein the corner strips are generally U-shaped when viewed in cross section.

8. The composite strip according to claim 7, wherein the corner strips are identical to one another.

* * * * *